(12) United States Patent
Yamagishi et al.

(10) Patent No.: US 7,726,672 B2
(45) Date of Patent: Jun. 1, 2010

(54) VEHICLE BODY FRONT PART STRUCTURE

(75) Inventors: Michihiro Yamagishi, Sagamihara (JP); Shunsuke Ehara, Sagamihara (JP); Hiroshi Osanai, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/140,726

(22) Filed: Jun. 17, 2008

(65) Prior Publication Data

US 2008/0309124 A1 Dec. 18, 2008

(30) Foreign Application Priority Data

Jun. 18, 2007 (JP) ............................. 2007-159940
Jan. 28, 2008 (JP) ............................. 2008-016340

(51) Int. Cl.
*B60G 7/02* (2006.01)

(52) U.S. Cl. .............................................. 280/124.109

(58) Field of Classification Search .......... 280/124.109, 280/124.128, 124.149, 124.13, 124.152
See application file for complete search history.

(56) References Cited

U.S. PATENT DOCUMENTS

| 3,831,970 | A | 8/1974 | Muller |
| 5,280,957 | A | * | 1/1994 | Hentschel et al. ........... 280/788 |
| 6,982,647 | B2 | 1/2006 | Kuge et al. |
| 2005/0046166 | A1 | 3/2005 | Reim et al. |

FOREIGN PATENT DOCUMENTS

| EP | 1 510 444 A1 | 3/2005 |
| EP | 1 533 151 A1 | 5/2005 |
| EP | 1 533 151 B1 | 9/2006 |
| JP | 03092409 A | * 4/1991 |
| JP | 10 045022 A | 2/1998 |
| JP | 11 171046 A | 6/1999 |
| JP | 2000108633 A | * 4/2000 |
| JP | 2004-17930 | 1/2004 |
| JP | 3954709 B2 | 5/2007 |

* cited by examiner

*Primary Examiner*—Faye M. Fleming
(74) *Attorney, Agent, or Firm*—Foley & Lardner LLP

(57) ABSTRACT

A suspension member is fixed to a front part of a vehicle body from below. A stabilizer is fixedly held on an upper surface of the suspension member. The stabilizer has bent portions. At the time of a front end collision of the vehicle, a rear part of the suspension member separates from the vehicle body for rearward movement of the suspension member relative to the vehicle body to allow the bent portions to come into engagement with the vehicle body.

9 Claims, 4 Drawing Sheets

VEHICLE BODY FRONT PART STRUCTURE

The present application claims the priority of Japanese Patent Application No. 2007-159940, filed Jun. 18, 2007, the disclosure of which is hereby incorporated by reference in its entirety. In addition, the present application claims the priority of Japanese Patent Application No. 2008-016340, filed Jan. 28, 2008, claiming the priority of the above-identified Japanese Patent Application No. 2007-159940. The disclosure of this later identified Japanese Patent Application is hereby incorporated by reference in its entirety.

BACKGROUND OF THE INVENTION

1. Field of the Invention

The present invention relates to a vehicle body front part structure, and more particularly to a vehicle body front part structure which provides an arrangement such that, at the time of a collision of the vehicle, a rear part of a suspension member separates from a vehicle body frame.

2. Background Art

Conventionally, there is known a vehicle body front part structure that comprises a trapezoidal suspension member under a front part of a vehicle body frame. At four sites, namely, a front left site, a front right site, a rear left site and a rear right site, this suspension member is fixed to the vehicle body frame by means of bolts.

According to the above-mentioned known vehicle body front part structure, at the time of a collision (a front end collision) of the vehicle, the front part of the vehicle body frame is broken to absorb an impact of the collision and the suspension member moves to the rear. If, in this way, the suspension member moves to the rear, there is fear that the suspension member may hit a passenger compartment directly to cause undesired deformation of the passenger compartment.

JP-A 11-171046 (now JP Pat. No. 3954709) proposes a vehicle body front part structure to prevent a suspension member from deforming a passenger compartment at the time of a front end collision of a vehicle by letting rear left and right sites of the suspension member fall off a vehicle body frame to avoid fear that the suspension member may hit the compartment directly.

However, the above-mentioned vehicle body front part structure is not satisfactory in that the suspension member does not make any contribution to absorption of impact after the rear left and right sites of the suspension member has fallen off the vehicle body frame. Thus, this structure involves a problem in that it fails to absorb impact efficiently.

An object of the present invention is to provide a vehicle body front part structure which can absorb impact efficiently at the time of a collision of a vehicle.

SUMMARY OF THE INVENTION

According to one aspect of the present invention, there is provided a vehicle body front part structure, comprising:
a suspension member fixed to a front part of the vehicle body from below; and
a stabilizer fixedly held on an upper surface of the suspension member, the stabilizer having bent portions;
wherein an arrangement is such that, at the time of a collision of the vehicle, a rear part of the suspension member separates from the vehicle body for rearward movement of the suspension member relative to the vehicle body to allow the bent portions to come into engagement with the vehicle body to absorb an impact of the collision.

According to another aspect of the present invention, there is provided a method of absorbing an impact at the time of a front end collision of a vehicle having a vehicle body frame with a suspension member, comprising:
separating a rear part of a suspension member from the vehicle body frame for rearward movement of the suspension member relative to the vehicle body frame; and
allowing bent portions of a stabilizer fixedly held on an upper surface of the suspension member to come into engagement with stabilizer interference portions on the vehicle body frame.

According to still another aspect of the present invention, there is provided a vehicle body front part structure, comprising:
a suspension member fixed to a front part of a vehicle body frame from below;
a stabilizer fixedly held on an upper surface of the suspension member, the stabilizer having bent portions;
means whereby an arrangement is provided such that, at the time of a front end collision of the vehicle, a rear part of the suspension member separates from the vehicle body frame for rearward movement of the suspension member relative to the vehicle body frame; and
means for bearing load from the bent portions of the stabilizer.

DETAILED DESCRIPTION OF THE INVENTION

Hereinafter, the present invention is described along with its preferred embodiments.

Figure 1:
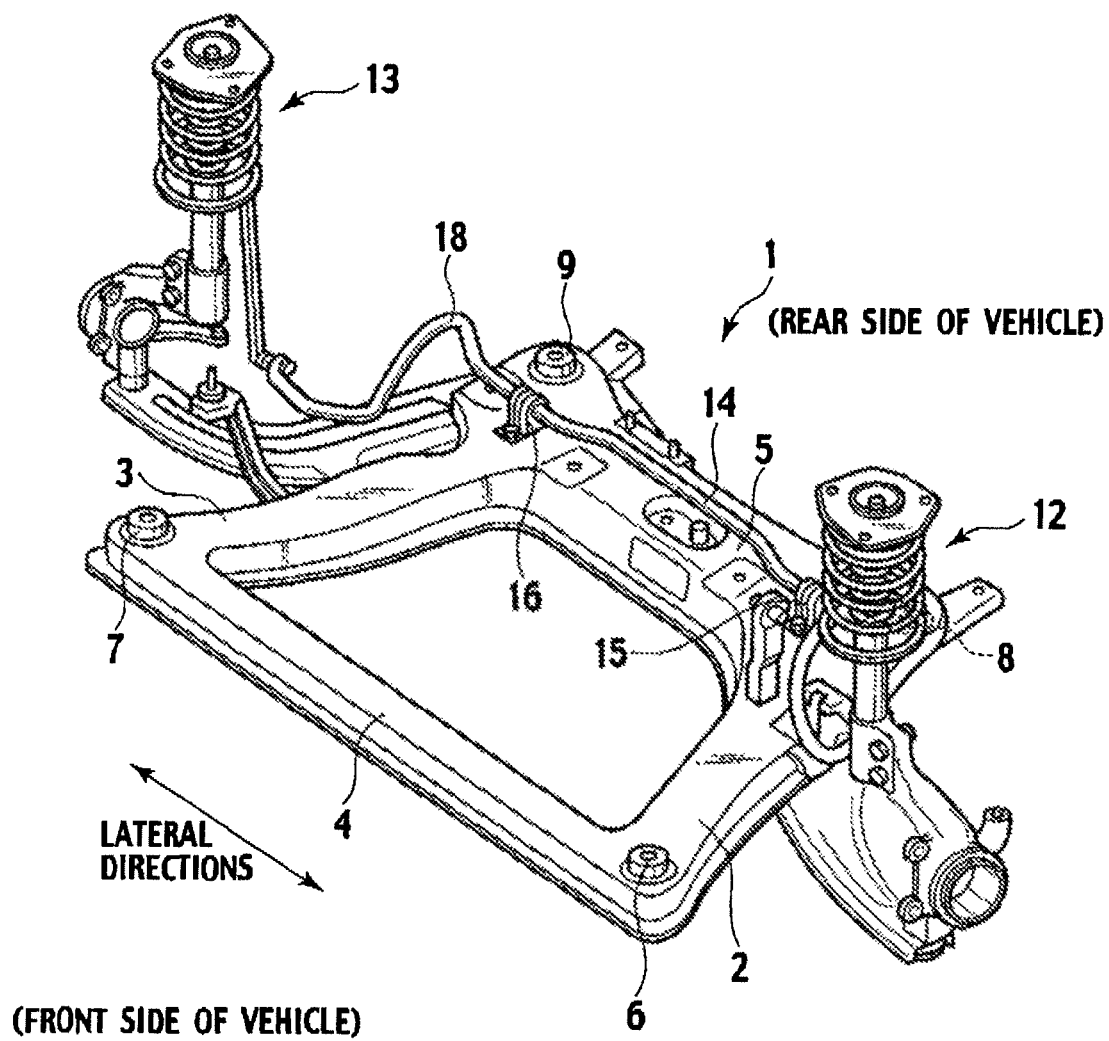
FIG. 1 is a perspective view of a suspension member with its peripheral structure.

FIG. 1 illustrates a suspension member 1. The suspension member 1, which, as a whole, seeing from the top, makes a trapezoidal frame shape, includes left and right side members 2 and 3, a front cross member 4 interconnecting the front ends of the left and right side members 2 and 3, and a rear cross member 5 interconnecting the rear ends of the left and right side members 2 and 3. A front side of the vehicle is at an angle to the left down viewing in FIG. 1, and a rear side of the vehicle is at an angle to the right up viewing in FIG. 1. Lateral directions of the vehicle (or vehicle width directions) extend between a laterally right side of the vehicle, which is an angle to the left up viewing in FIG. 1, and a laterally left side of the vehicle, which is an angle to the right down viewing in FIG. 1.

Figure 3:
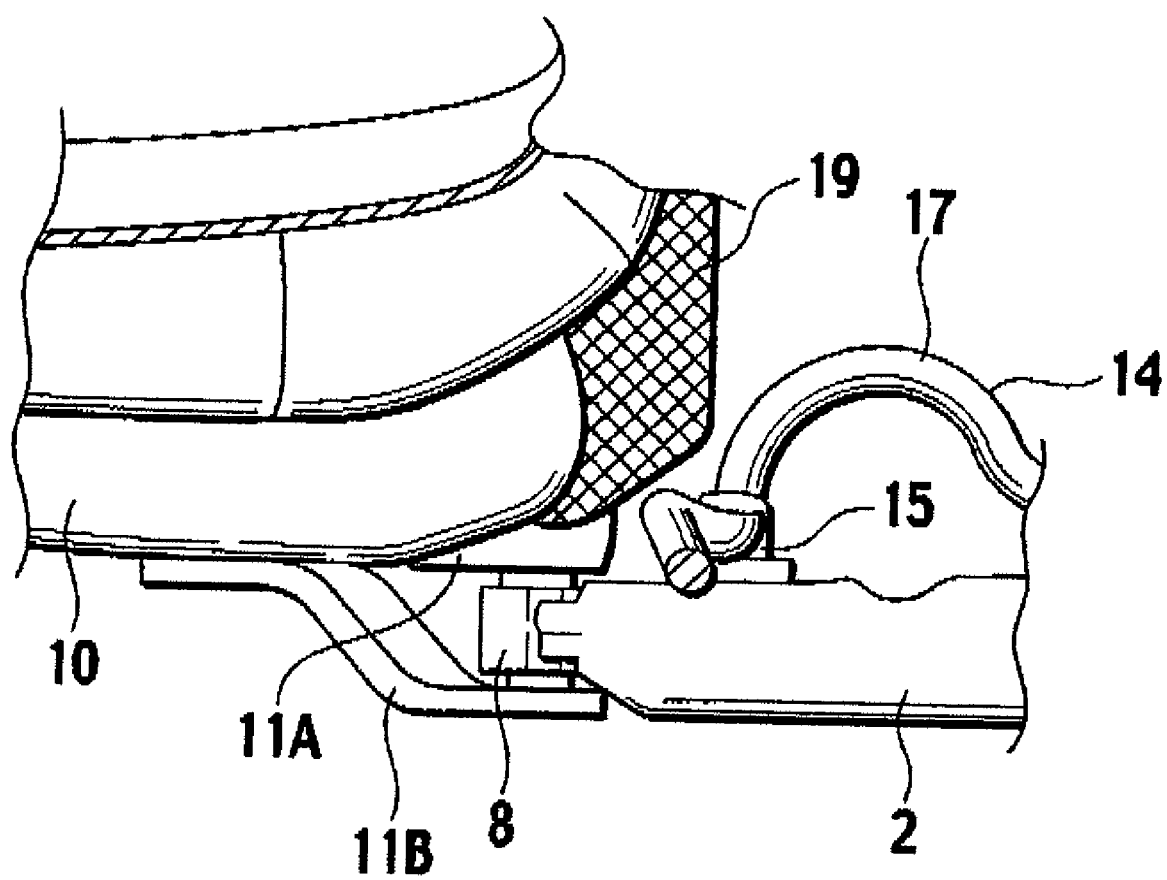
FIG. 3 is a fragmentary section taken through the line III-III in FIG. 2.

At two distant points on the suspension member 1 spaced in the lateral directions of the vehicle body and near the front ends of the side members 2 and 3, the suspension member 1 has front assembly fixtures 6 and 7, for example, screw connections. At two distant points on the suspension member 1 spaced in the lateral directions of the vehicle body and near the rear ends of the side members 2 and 3, the suspension member 1 has rear assembly fixtures 8 and 9, for example, screw connections. The suspension member 1 is fixed relative to a front part of the vehicle body frame 10 (see FIG. 3) from below by means of the assembly fixtures 6, 7, 8 and 9 and fasteners such as bolts. Each of the assembly fixtures 8 and 9 is fixedly held relative to the front part of the vehicle body frame 10 via a reinforcement element, only one for the assembly fixture 8 being shown at 11A in FIG. 3, and a bracket, only one for the assembly fixture 8 being shown at 11B in FIG. 3. Of course, the assembly fixture 9 is fixedly held in the same manner as the assembly fixture 8 is.

The reinforcement element 11A for each of the assembly fixtures 8 and 9 is designed to allow disengagement of the associated assembly fixture for rearward movement of the suspension member 1 during a front end collision of the vehicle. For example, the reinforcement elements for the assembly fixtures 8 and 9 may be deformed to allow such disengagement or may have deforming zones weak enough to allow such disengagement.

In addition, as shown in FIG. 1, the suspension member 1 has left and right suspension assemblies 12 and 13 on outer sides of the left and right side members 2 and 3. Connected between these suspension assemblies 12 and 13 is a stabilizer 14.

In the illustrated embodiment, the stabilizer 14 is arranged above the suspension member 1. Saying more concretely, it is arranged above the rear cross member 5. With U-shaped holdfasts 15 and 16, the stabilizer 1 is fixedly held on the upper surface of the suspension member 1 at two laterally distant left and right sites.

Figure 2:
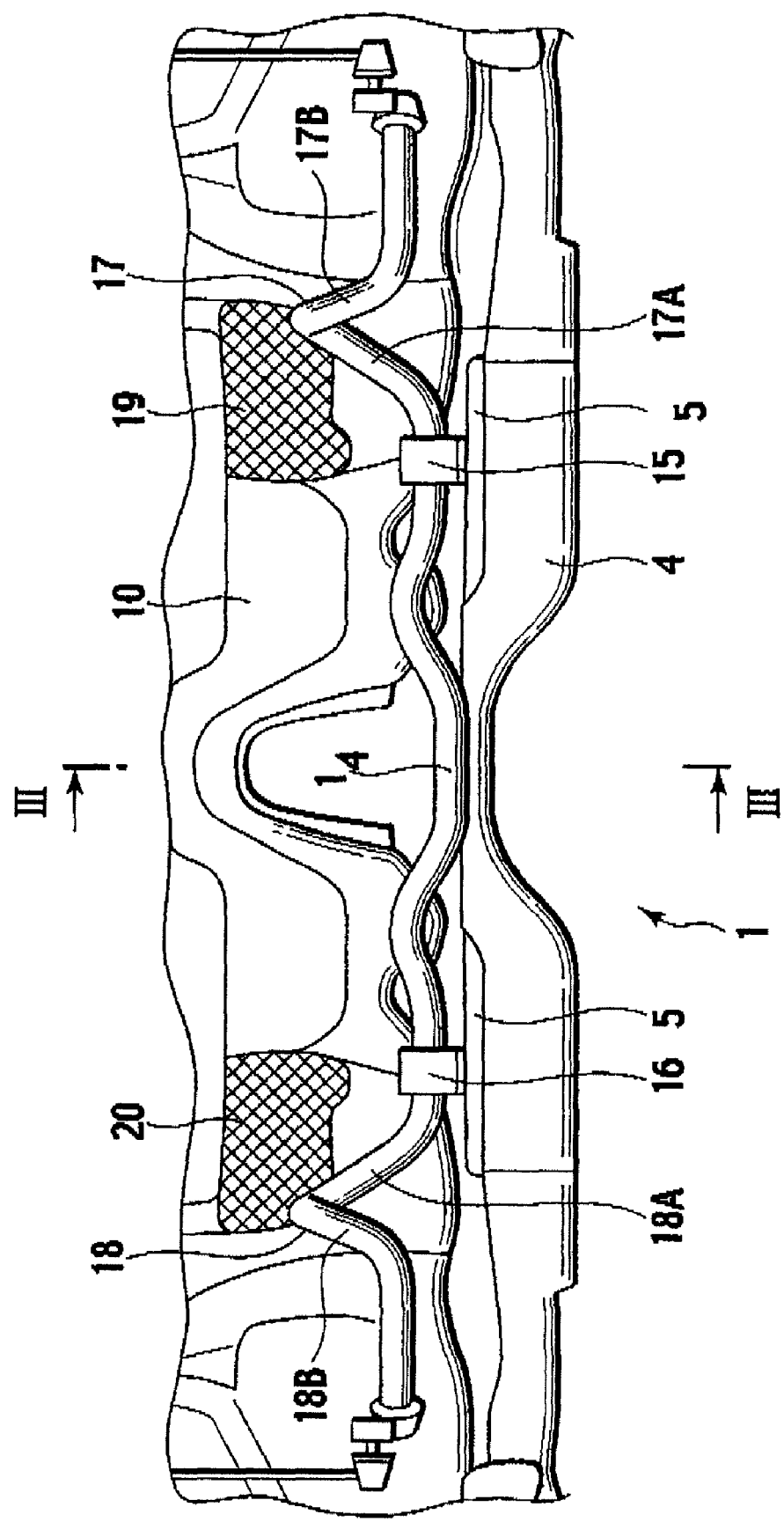
FIG. 2 is a fragmentary front view of a vehicle body front part structure according to the present invention viewing the structure from the front of the vehicle.

As shown in FIG. 2, at two distant points spaced in the lateral directions, the stabilizer 14 is formed with left and right bent portions 17 and 18. The left bent portion 17 is located laterally outwards the holdfast 15. The right bent portion 18 is located laterally outwards the holdfast 16.

The left bent portion 17 has an up-slope portion 17A, which is bent at an angle to the outside, in the one lateral direction of the vehicle body, up, and a down-slope portion 17B connected to the leading end of the up-slope portion 17A. The down-slope portion 17B is bent at an angle to the front, with respect to the vehicle body, down. The right bent portion 18 has an up-slope portion 18A, which is bent at an angle to the outside, in the opposite lateral direction of the vehicle body, up, and a down-slope portion 18B connected to the leading end of the up-slope portion 18A. The down-slope portion 18B is bent at an angle to the front, with respect to the vehicle body, down.

On the vehicle body frame 10, there are left and right stabilizer interference portions 19 and 20, as indicated by the illustrated cross hatching areas, at the rear of the left and right bent portions 17 and 18. It is set that the left and right stabilizer interference portions 19 and 20 are weaker in strength than the vehicle body frame 10. These interference portions 19 and 20 are so constructed and arranged to bear load from the bent portions 17 and 18 of the stabilizer 14.

Next, there is described how the illustrated embodiment of the vehicle body front part structure according to the present invention operates.

At the time of a collision (a front end collision) of the vehicle, the impact acts on the vehicle body frame 10 and the suspension member 1, causing that part(s) of the vehicle body frame 10 which are above the suspension member to be broken to absorb the impact. Then, the rear part of the suspension member 1 separates from the vehicle body frame 10 because the assembly fixtures 8 and 9 located near the rear ends of the side members 2 and 3, respectively, disengage from the associated reinforcement elements (see FIG. 4), only one of the reinforcement elements for the assembly fixture 8 being illustrated at 11A in FIGS. 3-4 together with the mating bracket 11B. The other reinforcement element and the mating bracket for the assembly fixture 9 are like the illustrated reinforcement element 11A and bracket 11B for the assembly fixture 8

Figure 5:
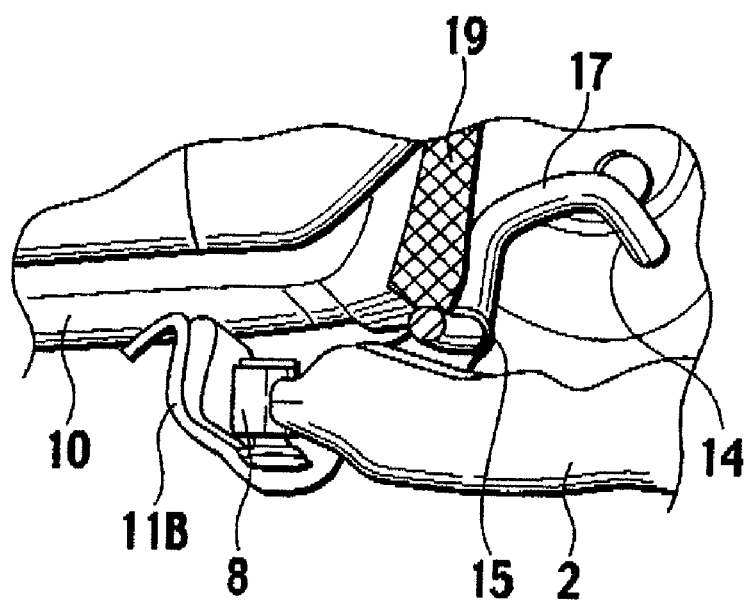
FIG. 5 is a fragmentary section like that of FIG. 3 showing the position of parts when the suspension member has come into engagement with the vehicle body frame.

When the impact acts more, the suspension member 1 moves to the rear of the vehicle together with the stabilizer 14, as illustrated in FIG. 5. Then, the left and right bent portions 17 and 18 come into engagement with the left and right stabilizer interference portions 10 and 20, respectively. It is set that the left and right stabilizer interference portions 19 and 20 on the vehicle body frame 10 are weaker in strength than the vehicle body frame 10, so that they are easy to be deformed during involvement in engagement with the bent portions 17 and 18 and can absorb the impact efficiently.

Figure 4:
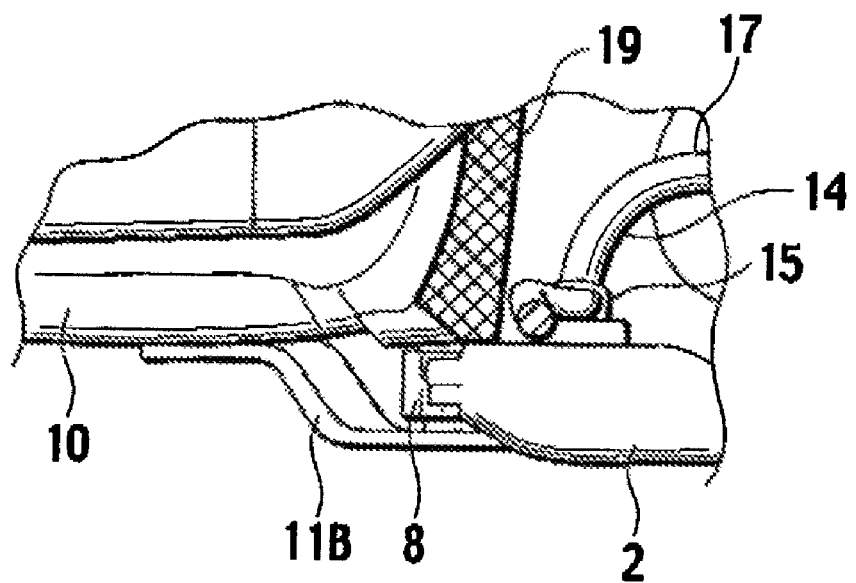
FIG. 4 is a fragmentary section like that of FIG. 3 showing the position of parts immediately after the suspension member has separated at its rear part from a vehicle body frame at the time of a collision of the vehicle.

Referring to FIGS. 4 and 5, the brackets 11B are deformed and left engaged with the associated assembly fixtures 8 and 9 during the collision. However, the brackets 11B may be disengaged from the associated assembly fixtures 8 and 9 during or after the collision.

In the illustrated embodiment, not only the body frame 10 but also the stabilizer interference portions 19 and 20 can absorb the impact of the collision efficiently because the impact is transmitted also to the left and right stabilizer interference portions 19 and 20.

In addition, the left and right bent portions 17 and 18 are located outwards, in the lateral directions of the vehicle body, the fixation points at which the stabilizer 14 is fixedly held on the upper surface of the suspension member 1 so that the stabilizer 14 is easy to be deformed and can absorb the impact of the collision more efficiently.

In addition, the left and right bent portions 17 and 18 include up-slope portions 17A and 18A, respectively, one 17A being bent at an angle to outside, in the one lateral direction, up, the other 18A being bent at an angle to outside, in the opposite lateral direction, up, so that the bent portions 17 and 18 have increased overlaps when they come into engagement with the left and right stabilizer interference portions 19 and 20 during the collision and can absorb the impact of the collision far more efficiently.

Furthermore, it is set that the left and right stabilizer interference portions 19 and 20 on the vehicle body frame 10 are weaker in strength than the vehicle body frame 10, so that they are easy to be dented during involvement in engagement with the bent portions 17 and 18, thus making it possible to prevent the stabilizer 14 from sliding during the engagement.

Moreover, the holdfasts 15 and 16, which hold the stabilizer 14 on the upper surface of the suspension member 1, and the bent portions 17 and 18 of the stabilizer 14 are arranged in symmetry with a centerline in fore-and-aft direction of the vehicle as shown in FIG. 2, so that, during a front end collision, the left and right stabilizer interference portions 19 and 20 can absorb the impact approximately equally.

In the preceding, the preferred embodiments of the present invention have been described in considerable detail, but it is only in an illustration of the present invention. Many modifications and variations to the preferred embodiments described will be apparent to a person ordinary skill in the art. Therefore, the present invention should not be limited to the preferred embodiments described.

The invention claimed is:

1. A vehicle body front part structure, comprising:
   a suspension member fixed to a front part of the vehicle body from below; and a stabilizer fixedly held on an upper surface of the suspension member, the stabilizer having bent portions;

wherein an arrangement is such that, at the time of a collision of the vehicle, a rear part of the suspension member separates from the vehicle body for rearward movement of the suspension member relative to the vehicle body to allow the bent portions to come into engagement with the vehicle body to absorb an impact of the collision.

2. The vehicle body front part structure as claimed in claim 1, wherein the bent portions are located laterally outwards, in the lateral directions of the vehicle body, fixation points at which the stabilizer is fixedly held on the upper surface of the suspension member.

3. The vehicle body front part structure as claimed in claim 1 wherein the bent portions include up-slope portions, respectively, one being bent at an angle to the outside, in one lateral direction of the vehicle body, up, the other being bent at an angle to the outside, in the opposite direction of the vehicle body, up.

4. The vehicle body front part structure as claimed in claim 1, wherein there are stabilizer interference portions which the bent portions are arranged to come into engagement with, and wherein the stabilizer interference portions are on a vehicle body frame of the vehicle body and weaker in strength than the vehicle body frame.

5. A method of absorbing an impact at the time of a front end collision of a vehicle having a vehicle body frame with a suspension member, comprising:

separating a rear part of a suspension member from the vehicle body frame for rearward movement of the suspension member relative to the vehicle body frame; and allowing bent portions of a stabilizer fixedly held on an upper surface of the suspension member to come into engagement with stabilizer interference portions on the vehicle body frame.

6. A vehicle body front part structure, comprising:

a suspension member fixed to a front part of a vehicle body frame from below;

a stabilizer fixedly held on an upper surface of the suspension member, the stabilizer having bent portions;

means whereby an arrangement is provided such that, at the time of a collision of the vehicle, a rear part of the suspension member separates from the vehicle body frame for rearward movement of the suspension member relative to the vehicle body frame; and means for bearing load from the bent portions of the stabilizer.

7. The vehicle body front part structure as claimed in claim 6, wherein the load bearing means includes stabilizer interference portions.

8. A vehicle body structure for a vehicle, comprising:

a vehicle body including a front part and a vehicle body frame formed with stabilizer interference portions;

a suspension member fixed to the front part of the vehicle body from below; and a stabilizer fixedly held on an upper surface of the suspension member, the stabilizer having bent portions, the stabilizer interference portions, the suspension member and the bent portions of the stabilizer providing an arrangement such that, at the time of a collision of the vehicle, a rear part of the suspension member separates from the vehicle body to allow the bent portions to come into contact with the stabilizer interference portions of the vehicle body to absorb an impact of the collision.

9. The vehicle body front part structure as claimed in claim 6, wherein the means for rearward movement of the suspension member allows the bent portions of the stabilizer to come in contact with the means for bearing load from the bent portions of the stabilizer.

* * * * *